(12) United States Patent
Nakagawa

(10) Patent No.: US 8,644,676 B2
(45) Date of Patent: Feb. 4, 2014

(54) DATA PROCESSING APPARATUS AND DATA PROCESSING METHOD

(75) Inventor: Shingo Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1130 days.

(21) Appl. No.: 12/070,126

(22) Filed: Feb. 15, 2008

(65) Prior Publication Data

US 2008/0199158 A1    Aug. 21, 2008

(30) Foreign Application Priority Data

Feb. 19, 2007  (JP) ................................ P2007-038124

(51) Int. Cl.
*H04N 9/80* (2006.01)

(52) U.S. Cl.
USPC ............ 386/248; 386/239; 386/326; 386/247

(58) Field of Classification Search
USPC .................... 386/326, 247, 292, 248
See application file for complete search history.

(56) References Cited

U.S. PATENT DOCUMENTS

| | | | | |
|---|---|---|---|---|
| 5,289,276 A | * | 2/1994 | Siracusa et al. | 348/469 |
| 5,371,547 A | * | 12/1994 | Siracusa et al. | 375/240.01 |
| 5,680,573 A | * | 10/1997 | Rubin et al. | 711/129 |
| 5,754,888 A | * | 5/1998 | Yang et al. | 710/52 |
| 5,761,716 A | * | 6/1998 | Byrn et al. | 711/133 |
| 6,259,386 B1 | * | 7/2001 | Miyawaki et al. | 341/60 |
| 6,279,055 B1 | * | 8/2001 | Ito et al. | 710/45 |
| 6,542,518 B1 | * | 4/2003 | Miyazawa | 370/468 |
| 6,577,814 B1 | * | 6/2003 | Ito et al. | 386/292 |
| 6,631,522 B1 | * | 10/2003 | Erdelyi | 725/53 |
| 6,711,344 B1 | * | 3/2004 | Ito et al. | 386/344 |
| 6,717,577 B1 | * | 4/2004 | Cheng et al. | 345/419 |
| 6,721,193 B2 | * | 4/2004 | Barnes | 365/49.17 |
| 6,754,434 B2 | * | 6/2004 | Fujisawa et al. | 386/278 |
| 6,779,079 B2 | * | 8/2004 | Hirose et al. | 711/112 |
| 2006/0224698 A1 | | 10/2006 | Shiobara et al. | |

FOREIGN PATENT DOCUMENTS

| | | |
|---|---|---|
| JP | 11 265263 | 9/1999 |
| JP | 2000 307978 | 11/2000 |
| JP | 2002 344901 | 11/2002 |
| JP | 2004 179913 | 6/2004 |
| JP | 2005 78385 | 3/2005 |

\* cited by examiner

*Primary Examiner* — Jung Kim
*Assistant Examiner* — Thomas Ho
(74) *Attorney, Agent, or Firm* — Frommer Lawrence & Haug LLP; William S. Frommer; Ellen Marcie Emas

(57) ABSTRACT

A data processing apparatus is provided. The data processing apparatus includes a plurality of ports, a memory, a determining unit, and a processing unit. The plurality of ports are configured to input and output video data. The memory is configured to store the video data when the video data is recorded onto a recording medium and when the video data is played back from a recording medium. The determining unit is configured to determine whether video data, for which a video data playback request designating one of the plurality of ports has been issued, is stored in the memory, using data identification information for identifying video data and usage management information. The processing unit is configured to have the video data stored in the memory outputted from the designated port, when the determining unit determines that the video data is stored.

8 Claims, 12 Drawing Sheets

BM [x]=(Box, Drv, Clip ID , Essence, Offset, Size, Count)

FIG. 13

■ LINKING OF BANKS BY CM

PORT#1: RECORD DATA A

| ADDRESS x=6 | ADDRESS x=7 | 2a |

PORT#2: CHASING PLAYBACK OF DATA A

| ADDRESS x=1 | ADDRESS x=2 | ADDRESS x=6 |

PORT#3: RECORD DATA B

| ADDRESS x=8 | ADDRESS x=9 |

■ BITMAPS PREPARED BY BMM

| ADDRESS x=0 COUNT=0 | ADDRESS x=1 COUNT=1 | ADDRESS x=2 COUNT=1 | ADDRESS x=3 COUNT=0 |
|---|---|---|---|
| ADDRESS x=4 COUNT=0 | ADDRESS x=5 COUNT=0 | ADDRESS x=6 COUNT=2 | ADDRESS x=7 COUNT=1 |
| ADDRESS x=8 COUNT=1 | ADDRESS x=9 COUNT=1 | ADDRESS x=10 COUNT=0 | ADDRESS x=11 COUNT=0 |

2a

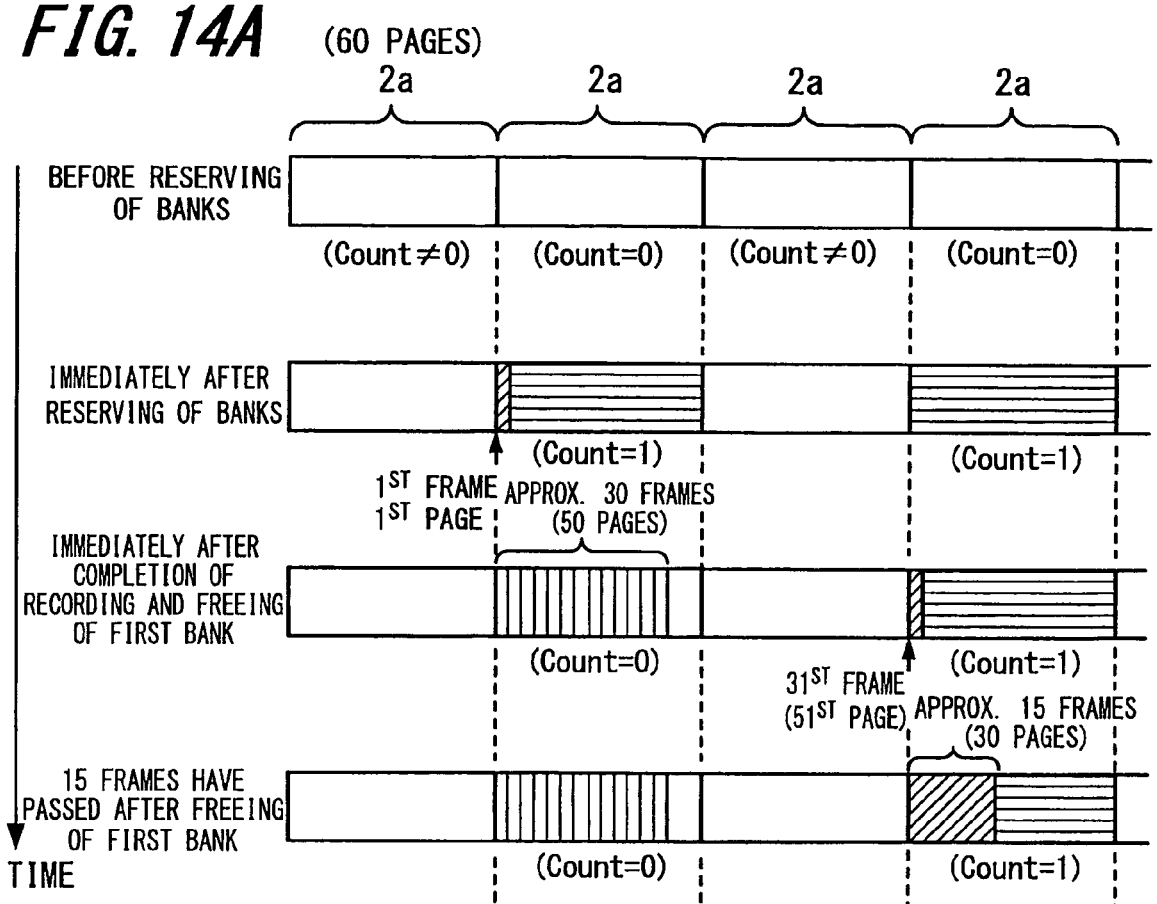
FIG. 14A
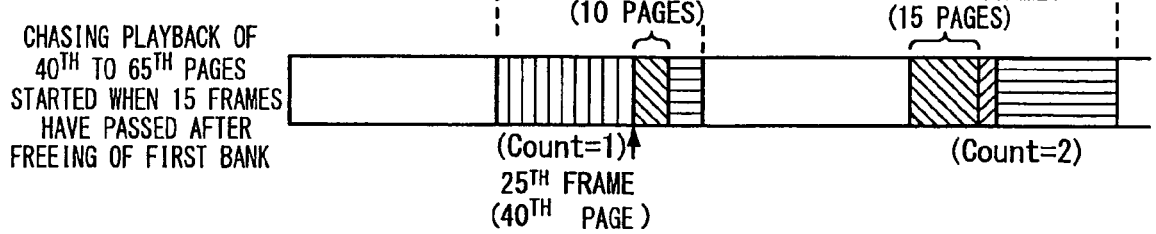
FIG. 14B
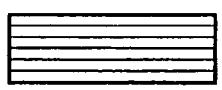 : RESERVED BANKS
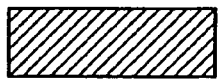 : DATA IN BANKS (YET TO BE RECORDED IN FLASH MEMORY)
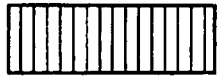 : DATA IN BANKS (ALREADY RECORDED IN FLASH MEMORY)
 : DATA IN BANKS (SUBJECTED TO CHASING PLAYBACK)

DATA PROCESSING APPARATUS AND DATA PROCESSING METHOD

CROSS REFERENCES TO RELATED APPLICATIONS

The present invention contains subject matter related to Japanese Patent Application JP 2007-038124 filed in the Japanese Patent Office on Feb. 19, 2007, the entire contents of which being incorporated herein by reference.

BACKGROUND OF THE INVENTION

1. Field of the Invention

The present invention relates to a data processing apparatus, such as an AV (audio/video) server for television broadcasts or a non-linear editor, where a non-linear recording medium is accessed from two or more input/output ports to record and/or play back video data.

2. Description of the Related Art

AV servers and non-linear editors with a plurality of input/output ports and a large-capacity recording medium (such as a hard disk drive or flash memory) as main storage that is capable of non-linear access are becoming more widespread as appliances that allow AV data to be recorded, played back, and edited for television broadcasts.

In an AV server or non-linear editor, to prevent all of the plurality of input/output ports from accessing the main storage at the same time, access to the main storage from the respective input/output ports is normally managed using time slots (see, for example, Japanese Unexamined Patent Application Publication No. 2000-307978 (Paragraphs 0008 and 0046 to 0047)). Also, to make it possible for each input/output port to input and output AV data at a predetermined rate irrespective of such time slots, a memory is provided for temporarily storing AV data during recording and playback into and from the main storage.

FIG. 1 is a diagram schematically showing one method of managing a memory used to temporarily store AV data in a AV server or non-linear editor of the related art. For example, if there are five input/output ports numbered Port#1 to Port#5, the entire storage region of the memory M is divided into and managed as five regions M1 to M5 that are dedicated to the ports Port#1 to Port#5.

When AV data is inputted into the input/output port Port#1, each frame in the AV data is written into the region M1 of the memory M. When a predetermined amount of AV data has accumulated in the region M1, the AV data in the region M1 is recorded in the main storage MS at the timing of a time slot assigned to the input/output port Port#1.

In the same way, when AV data is outputted from the input/output port Port#2, AV data inside the main storage MS is written into the region M2 of the AV data memory M at the timing of the time slot assigned to the input/output port Port#2. Each frame in the AV data written into the region M2 is outputted from the input/output port Port#2. The same process is also carried out for the input/output ports Port#3 to Port#5.

However, the functions of an AV server and a non-linear editor include a function called "chasing playback" where AV data inputted into a given input/output port is immediately outputted from another input/output port. As examples, chasing playback is used when replaying highlights during a live sports broadcast and when editing AV data shot on-location during a news program.

In the past, when an AV server or non-linear editor carries out chasing playback, AV data has been recorded in the main storage MS.

SUMMARY OF THE INVENTION

However, with the typical chasing playback method described above, after AV data has been inputted, such AV data may not be outputted for a total of the waiting time due to time slot management during recording and the waiting time due to time slot management during playback.

Since this reduces responsiveness for chasing playback, there have been delays when showing replays or editing footage during the sports broadcasts and news programs described above.

It is desirable to improve the responsiveness of chasing playback in a data processing apparatus, such as an AV server or a non-linear editor, that records and plays back video data by accessing a non-linear recording medium from two or more input/output ports.

According to an embodiment of the present invention, there is provided a data processing apparatus including: a plurality of ports, a memory, a determining unit, and a processing unit. The plurality of ports are configured to input and output video data. The memory is configured to store the video data when the video data is recorded onto a recording medium and when the video data is played back from a recording medium. The determining unit is configured to determine whether video data, for which a video data playback request designating one of the plurality of ports has been issued, is stored in the memory, using data identification information for identifying video data stored in each region in the memory and usage management information showing whether each region in the memory is being used by the ports. The processing unit is operable when the determining unit determines that the video data is stored, to have the video data stored in the memory outputted from the designated port.

According to an embodiment of the present invention, there is provided a data processing method including the steps of:

determining whether video data, for which a video data playback request designating a port has been issued, is stored in a memory, using data identification information, which identifies video data stored in each region in the memory that stores video data when the video data is recorded onto a recording medium or the video data is played back from the recording medium, and usage management information showing whether each region in the memory is being used by the port that inputs or outputs video data; and outputting the video data stored in the memory from the designated port, when it is determined in the determining step that the video data is stored.

According to the embodiments of the present invention, in a data processing apparatus where video data is recorded or played back by accessing a non-linear recording medium from two or more input/output ports, data identification information that indicates what kind of video data is stored is prepared for each region of a memory for temporarily storing video data when the video data is recorded onto or played back from the non-linear recording medium.

When there is a playback request for video data, a search is conducted using the data identification information to find out whether the video data subjected to the playback request has been stored in the memory. If the video data has been stored, the video data stored in the memory is outputted without playing back the video data from the non-linear recording medium.

During chasing playback, the video data to be played back will have only just been stored in the memory so that the data can be recorded on the non-linear recording medium. This means that there is a high probability of the video data still being stored in the memory (i.e., a high probability that the region in the memory that stored such video data will not have been overwritten to record or play back other data).

Accordingly, there will be a large number of cases where chasing playback can be carried out at high speed using the memory as a cache memory without having to access the non-linear recording medium (i.e., without being affected by an access wait time for the non-linear recording medium due to time slot management). This means that the responsiveness of chasing playback can be improved.

According to the embodiments of the present invention, it is possible to improve the responsiveness of chasing playback in a data processing apparatus that records and plays back data by accessing a non-linear recording medium from two or more input/output ports.

BRIEF DESCRIPTION OF THE DRAWINGS

FIG. 13 is a diagram showing representations of the bitmaps of the banks in the bank memory and the linking of banks by the clip manager.

FIGS. 14A and 14B are diagrams showing an example of how chasing playback is carried out using the bank memory.

DESCRIPTION OF THE PREFERRED EMBODIMENTS

An example where an embodiment of the present invention is applied to a video server for television broadcasts will now be described in detail with reference to the attached drawings.

Figure 2:
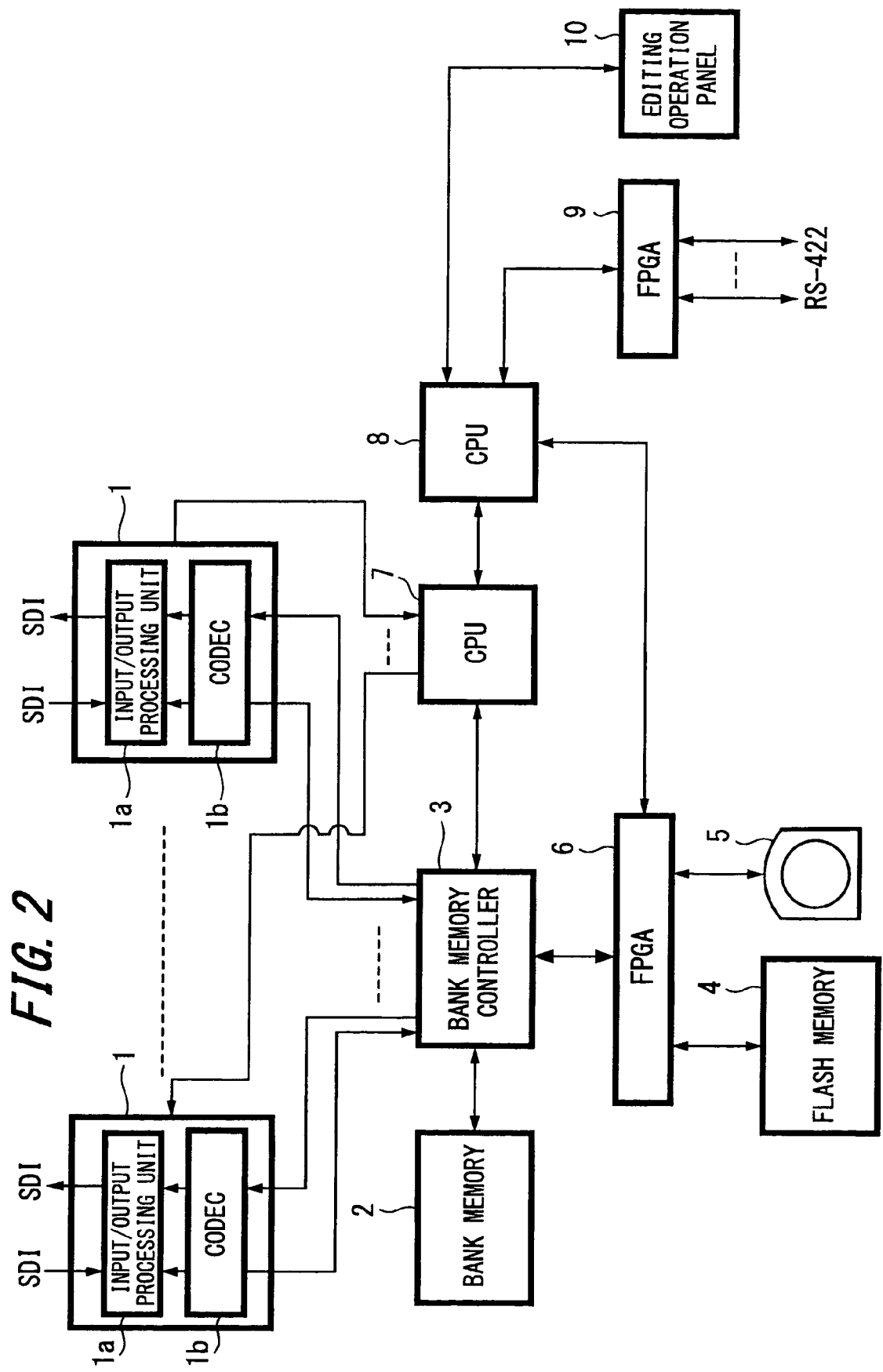
FIG. 2 is a diagram showing one example of the overall configuration of an AV server to which an embodiment of the present invention has been applied.

First, the overall configuration of an AV server to which an embodiment of the present invention has been applied will be described with reference to FIG. 2. This video server includes the following elements:

a plurality of (for example, five) SDI input/output ports 1 that input and output serial digital signals according to SDI standard;

a bank memory 2;

a bank memory controller 3 for reading and writing AV data from and into the bank memory 2;

a large-capacity flash memory 4 as main storage that records AV data inputted into the respective SDI input/output ports 1;

an optical disc drive 5 for recording only AV data that has been inputted into one SDI input/output port 1 determined by a setting up operation or the like;

an FPGA 6 provided with a low-performance processor for controlling the flash memory 4 and the optical disc drive 5;

a CPU 7 that controls the SDI input/output ports 1 and the bank memory controller 3;

a CPU 8 that controls the entire AV server;

an FPGA 9 provided with a low-performance processor which converts the protocol of record/playback commands for each SDI input/output port 1 that have been received from the periphery according to RS-422 protocol, sends the converted commands to the CPU 8, and converts a status received from the CPU 8 to RS-422 protocol and sends the converted status to the periphery as a reply; and an editing operation panel 10 for carrying out editing operations, such as a cut edit, on the AV data recorded in the flash memory 4 and/or the optical disc drive 5.

Each SDI input/output port 1 includes an input/output processing unit 1a and a codec 1b. During recording, a serial digital signal according to SDI standard that is inputted into an SDI input/output port 1 is converted to parallel AV data (i.e., data composed of four types of essence: video data; audio data; proxy data used for editing; and real time metadata) by the input/output processing unit 1a, is encoded (i.e., compressed) using Long GOP by the codec 1b, and is sent to the bank memory controller 3.

Also, during playback, the AV data sent to the SDI input/output port 1 from the bank memory controller 3 is decoded (i.e., decompressed) using Long GOP by the codec 1b, is converted to a serial digital signal according to SDI standard by the input/output processing unit 1a, and is outputted.

The bank memory 2 is a memory for temporarily storing AV data during the recording and playback of AV data to or from the flash memory 4 and the optical disc drive 5 and has a capacity of 2 GB, for example.

Note that although not shown in the drawings, the AV server may be provided with an external interface so that a plurality of AV servers of the same configuration can be connected and the flash memory 4 of another AV server can be accessed from the SDI input/output ports 1 of the respective AV servers. During recording or playback when the flash memory 4 is being accessed from an SDI input/output port 1 of another AV server, the AV data is temporarily held in the bank memory 2.

Figure 3:
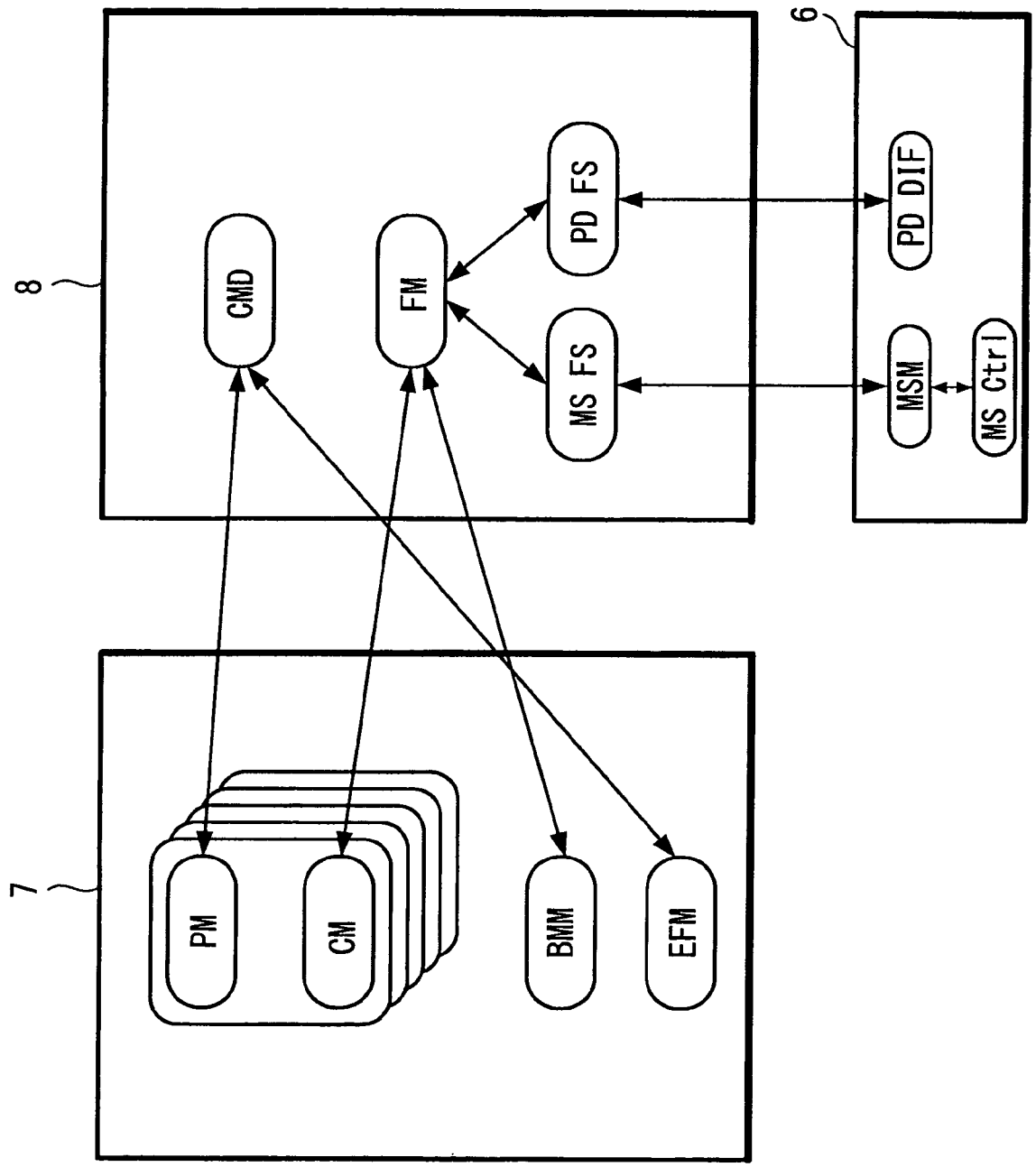
FIG. 3 is a diagram showing the module structure of programs stored in a CPU 7, a CPU 8, and an FPGA 6 in FIG. 2.

Various programs are stored in internal memories of the CPU 7, the CPU 8 and the processor of the FPGA 6. FIG. 3 is a diagram showing the module structure of such programs.

The following programs are stored in the memory of the CPU 8:

a program CMD that interprets commands from the FPGA 9;

a file system MSFS that manages AV data in the flash memory 4;

a file system PDFS that manages AV data in the optical disc drive 5; and a file manager FM that is a higher level program than the file systems MSFS and PDFS.

The following programs are stored in the memory of the CPU 7:

a port manager PM that is separately provided for each SDI input/output port 1 and controls the corresponding SDI input/output port 1 and a clip manager CM that is also separately provided for each SDI input/output port 1 and controls the bank memory controller 3 to carry out reads and writes of AV data into the bank memory 2;

a bank memory manager BMM that manages the bank memory 2 and controls the bank memory controller 3; and a program EFM for editing AV data recorded in the flash memory 4 and/or the optical disc drive 5.

The following programs are stored in the memory of the processor of the FPGA 6:

a main storage manager MSM that controls access from each SDI input/output port 1 to the flash memory 4 using time slots;

a main storage controller MSCtrl that controls the flash memory 4; and a program PDDIF that controls the optical disc drive 5.

Out of the modules shown in FIG. 3, the bank memory manager BMM is newly provided according to an embodiment of the present invention and the other modules are existing programs. Although the relationships between the modules (i.e., the communication between modules) have been drawn using arrows in FIG. 3, if such relationships are redrawn centered on the bank memory manager BMM, the result is shown in FIG. 4.

Figure 4:
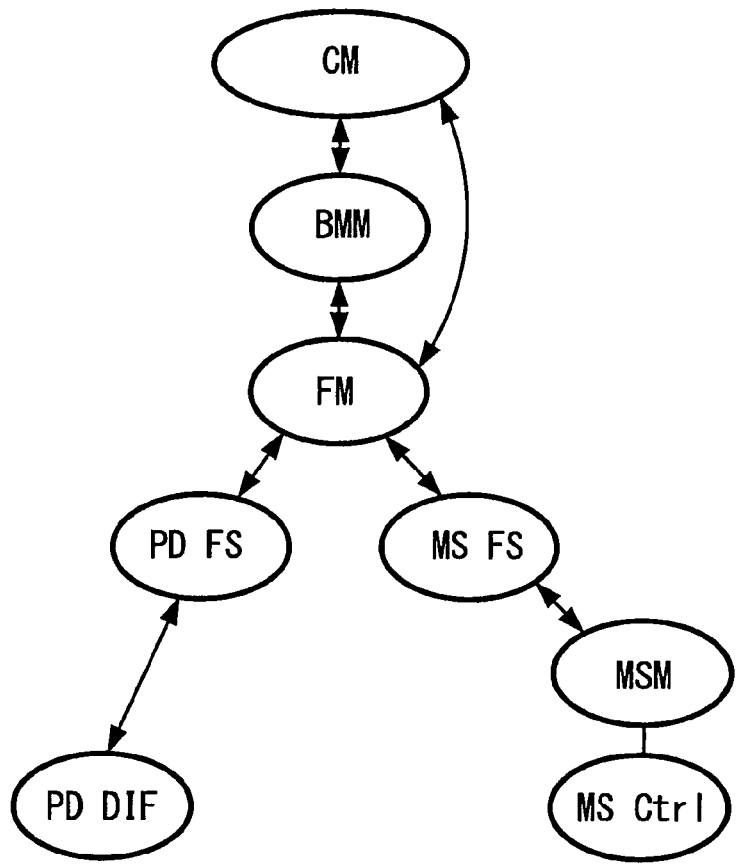
FIG. 4 is a diagram showing the relationship between a bank memory manager and other modules.

As shown in FIG. 4, the bank memory manager BMM is provided between each clip manager CM and the file manager FM and communicates with the clip managers CM and the file manager FM. However, not all of the communication between the clip managers CM and the file manager FM is carried out via the bank memory manager BMM and the clip managers CM also communicate directly with the file manager FM.

The bank memory manager BMM includes the following functions (a) to (d):

(a) Bitmap management of the bank memory 2;
(b) Reserving control of the bank memory 2;
(c) Freeing control of the bank memory 2; and
(d) Management of a usage history of the bank memory 2.

Figure 1:
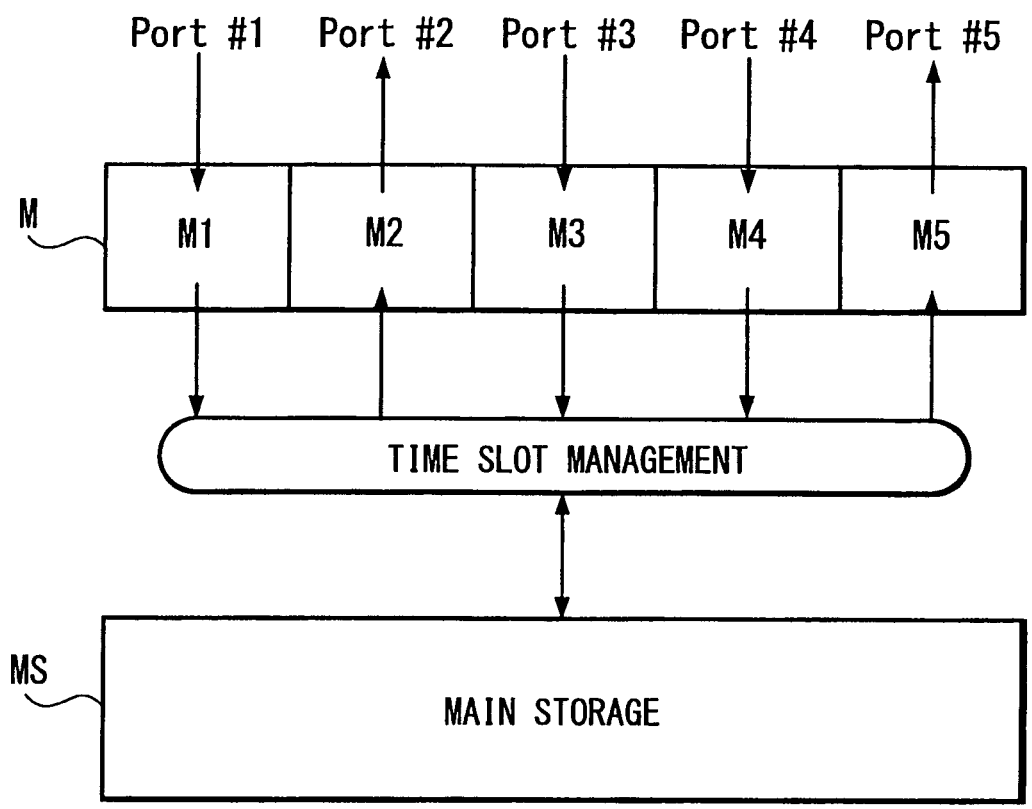
FIG. 1 shows how a memory for temporarily storing AV data is managed in an AV server of related art.
Figure 5:
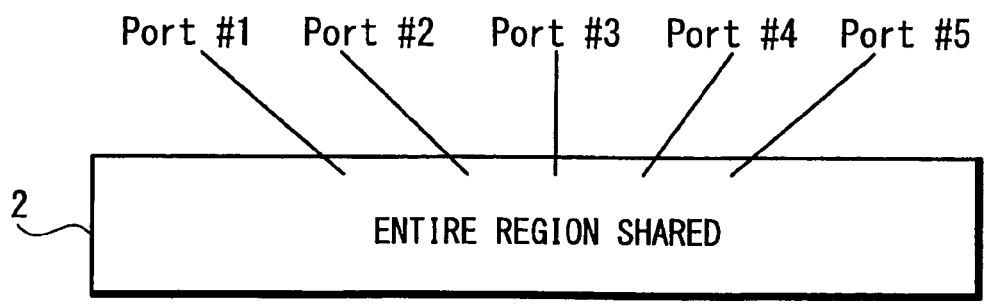
FIG. 5 is a diagram showing how a bank memory is managed by the bank memory manager.

Out of these, as schematically shown in FIG. 5, the bitmap management handles the entire region of the bank memory 2 as a region that is shared by all of the SDI input/output ports 1 (indicated as Port#1 to Port#5). That is, unlike the existing management method shown in FIG. 1, the bank memory 2 is not divided into regions that are dedicated to each SDI input/output port 1.

Figures 6, 7:
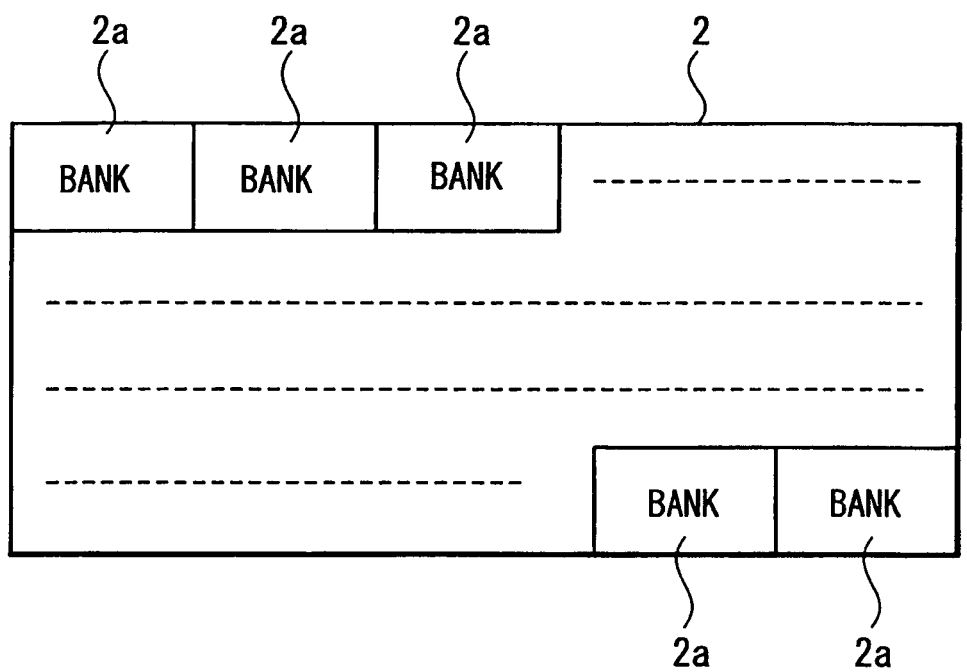
FIG. 6 is a diagram showing banks inside the bank memory.
FIG. 7 is a diagram showing information that composes a bitmap.

Also, as shown in FIG. 6, in the bitmap management, the entire region of the bank memory 2 is partitioned into a plurality of banks 2a that each store one type of essence (i.e., one of video data, audio data, proxy data used for editing, and real time metadata). Note that although the banks 2a have a fixed size such as 8 MB in this example, as another example, the size of each bank 2a may differ according to the type of essence stored in the bank 2a.

Also, in the bitmap management, each bank 2a is managed by a bitmap composed of information such as that shown in FIG. 7. In this bitmap, "x" in BM[x] is the value of an address which shows the order of the bank 2a in the bank memory 2. "Box" is information that identifies each AV server when a plurality of AV servers are connected as described earlier. "Drv" is information showing whether the recording destination or playback source of the AV data is the flash memory 4 or the optical disc drive 5.

"ClipID" is information for identifying a clip (i.e., one piece of AV data). "Essence" is information showing an essence type that is one of video data, audio data, proxy data, and real time metadata. "Offset" is information showing how many bytes are between the start of the essence and the start of the data in the present bank. "Size" is information showing the size of the data starting from the "Offset" as a number of bytes.

"Count" is information showing the number of SDI input/output ports 1 that are presently using the bank 2a. When the bank 2a in question is not being used by any of the SDI input/output ports 1, the value of "Count" is set at "0". Whenever one SDI input/output port 1 reserves the bank 2a in question by reserving control of the bank memory 2 in (b) described above, the "Count" value of such bank 2a is incremented by one, and whenever one SDI input/output port 1 frees the bank 2a in question by the freeing control of the bank memory 2 in (c) described above, the "Count" value of such bank 2a is decremented (such reserving control and freeing control will be described later with reference to FIGS. 9 to 12).

Note that the information from "Box" to "Size" is prepared by the bank 2a in question being reserved by any of the SDI input/output ports 1, and even if the value of "Count" subsequently becomes zero due to the bank 2a in question being freed (that is, even if the bank 2a in question becomes no longer used by any of the SDI input/output ports 1) the information from "Box" to "Size" will remain. The data is kept to make it possible to also search banks 2a that are not presently being used and to use the data stored in such banks 2a during the processing of playback that will be described later with reference to FIG. 11 and FIG. 12.

Figure 8:
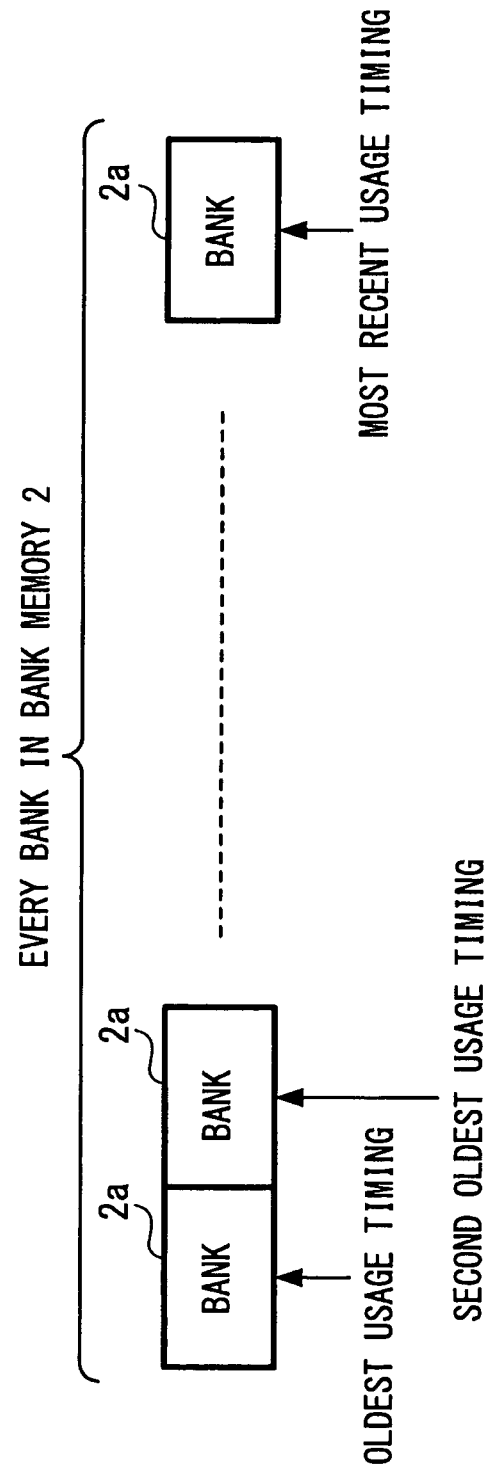
FIG. 8 is a diagram showing usage history information of each bank in the bank memory.

During the management of the usage history of the bank memory 2 in (d) described above, information on the usage history of the respective banks 2a is prepared based on the bit maps of the respective banks 2a. In the information on the usage history, every bank 2a is recorded in the order of the usage timings of the banks 2a. That is, as shown in FIG. 8, banks 2a that are not presently being used (i.e., banks 2a whose "Count" value in the bitmap is zero) are registered in order starting from the bank 2a with the oldest usage timing (i.e., the timing at which the "Count" value was one or higher). When the "Count" value in the bitmap for a bank 2a is incremented due to the bank 2a having been newly reserved, the information on the usage history of such bank 2a is updated so that the bank 2a is registered as the bank 2a with the most recent usage timing.

Next, the processing of the bank memory manager BMM during the recording of AV data will be described. When a recording command that designates one of the SDI input/output ports 1 and the recording destination of the AV data (i.e., the flash memory 4 or the optical disc drive 5) has been received by the FPGA 9, the command is interpreted by the processing of the program CMD (see FIG. 3), and a command is sent to the port manager PM (see FIG. 3) of the designated SDI input/output port 1.

The port manager PM converts a serial digital signal according to SDI standard inputted into the SDI input/output port 1 to parallel AV data, encodes the parallel AV data, and supplies the encoded data to the bank memory controller 3.

The port manager PM transfers the command from the program CMD to the clip manager CM (see FIGS. 3 and 4). Based on this command, before the AV data is encoded by the SDI input/output port 1, the clip manager CM sends a reservation request for a region in the bank memory 2 for storing the AV data to the bank memory manager BMM.

Figure 9:
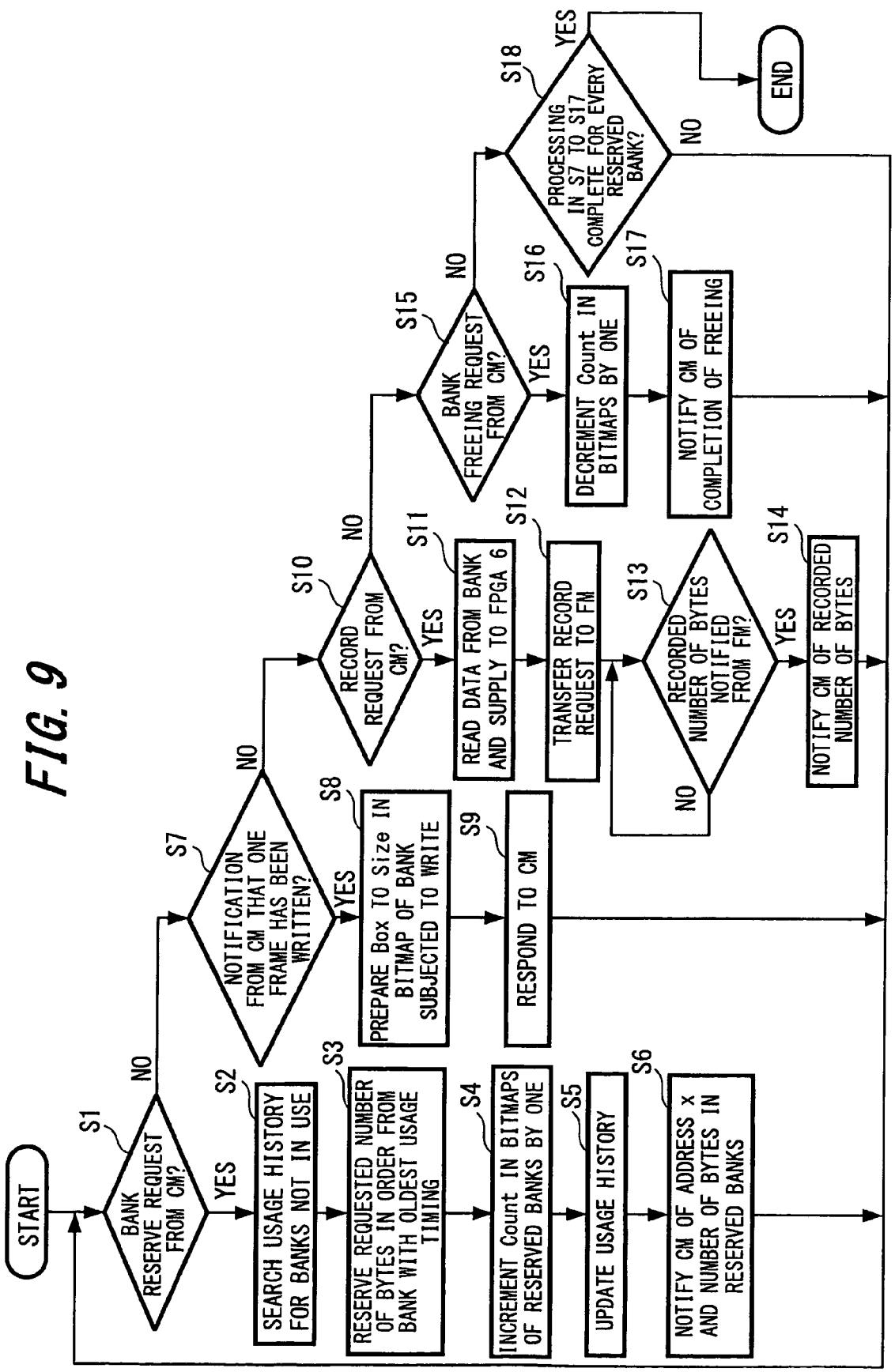
FIG. 9 is a flowchart showing the processing of the bank memory manager during recording.
Figure 10:
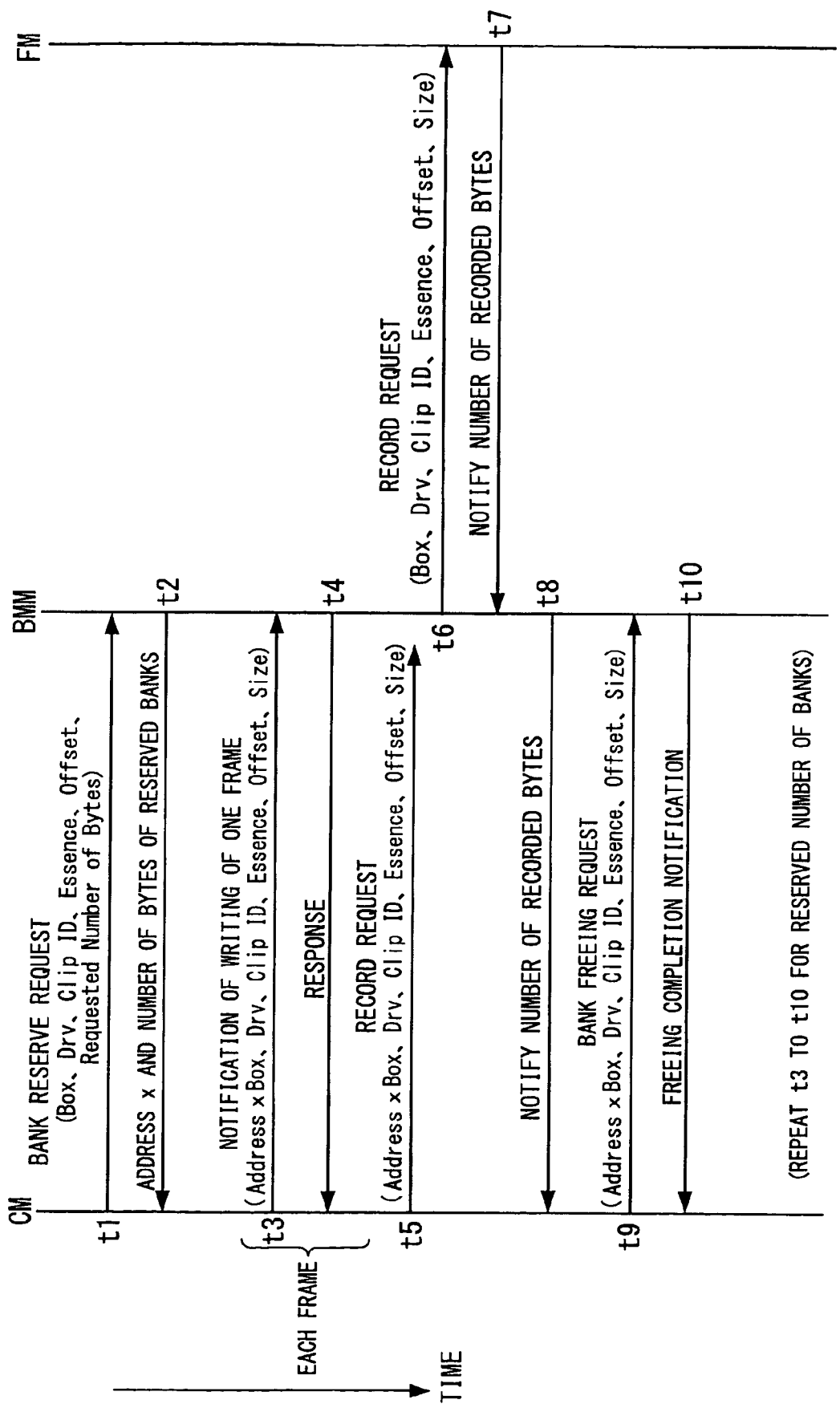
FIG. 10 is a diagram showing the communication between a clip manager, the bank memory manager, and a file manager during recording.

FIG. 9 is a flowchart showing the processing of the bank memory manager BMM based on this reservation request. FIG. 10 shows the communication between the clip manager CM, the bank memory manager BMM, and the file manager FM on a time axis during recording.

The clip manager CM sends a reservation request for a region in the bank memory 2 together with "Box", "Drv", "ClipID", "Essence", and "Offset" shown in FIG. 7 and information on the number of bytes that the request wishes to reserve to the bank memory manager BMM (t1 in FIG. 10).

On receiving the reservation request (step S1 in FIG. 9), the bank memory manager BMM refers to the information on the usage history (see FIG. 8) and searches the banks 2a of the bank memory 2 for banks 2a that are not presently being used (step S2 in FIG. 9).

Next, banks 2a that include the requested number of bytes (for example, if the requested number of bytes is 20 MB and the size of each bank 2a is 8 MB, three banks) are reserved out of the banks 2a found by the search in order starting from the bank 2a with the oldest usage timing (step S3 in FIG. 9).

The reason that banks are reserved in order starting with the oldest usage timing in step S3 is to prevent banks 2a that have been used most recently from quickly being used to record other data. By doing so, in the processing during playback that will be described later with reference to FIG. 11 and FIG. 12, it is possible to increase the opportunities for using the stored data, to improve the responsiveness of chasing playback, and to improve the responsiveness when forward/reverse playback are repeatedly executed.

For example, consider a case where out of all the SDI input/output ports 1, data A is recorded by one port (here, Port#1), chasing playback of the data A is carried out by another port (here, Port#2), and other data (data B) is recorded by yet another port (here, Port#3). If the banks 2a that were used by Port#1 to record the data A were then used by Port#3 to record the data B immediately after the recording of data A is completed (i.e., when such banks 2a stop being used), it would no longer be possible to use the data A stored in the banks 2a to carry out chasing playback of the data A on Port#2. For this reason, to avoid the above situation, in step S3 banks are reserved in order starting from the oldest usage timing.

As shown in FIG. 9, after step S3, the value of "Count" in the bitmap for each reserved bank 2a is incremented by 1 (step S4 in FIG. 9) and the information on the usage history is updated so that the reserved banks 2a are set as the banks 2a with the most recent usage timing (step S5 in FIG. 9).

Next, as a response to the reservation request, the clip manager CM that issued the request is informed of the addresses x (see FIG. 7) of the reserved banks 2a and the total number of bytes in the reserved banks 2a (step S6 in FIG. 9, t2 in FIG. 10).

The clip manager CM controls the bank memory controller 3 and writes each frame of the AV data encoded by the SDI input/output port 1 in the reserved banks 2a out of the banks 2a of the bank memory 2.

Whenever one frame of data is written in a bank 2a, the clip manager CM sends a notification that one frame of data has been written into a bank 2a together with the address of the bank 2a used for the write and "Box", "Drv, "ClipID", "Essence", and "Offset" information (see FIG. 7) for that bank 2a to the bank memory manager BMM (t3 in FIG. 10). "Size", which is information on the data size in byte units, is sent to make it possible to carry out chasing playback at maximum speed during playback at a low bitrate or variable bitrate.

Whenever such notification for each frame is received (step S7 in FIG. 9), the bank memory manager BMM prepares information from "Box" to "Size" (see FIG. 7) in the bitmap for the bank 2a used for the write (i.e., once such information has been prepared, only "Size" is updated) (step S8 in FIG. 8), and sends a response to the clip manager CM (step S9 in FIG. 9, t4 in FIG. 10).

After this, once a predetermined number of bytes of data have accumulated in one bank 2a (for example, around ⅝ of the size of the bank 2a), the clip manager CM sends a recording request for the flash memory 4 or the optical disc drive 5 together with the address x of the bank 2a and "Box", "Drv, "ClipID", "Essence", "Offset", and "Size" information of the bank 2a (see FIG. 7) to the bank memory manager BMM (t5 in FIG. 10).

On receiving the recording request (step S10 in FIG. 9), the bank memory manager BMM controls the bank memory controller 3 to have all of the data read from the bank 2a in question and supplied to the FPGA 6 (step S11 in FIG. 9). The bank memory manager BMM also transfers the recording request to the file manager FM (see FIGS. 3 and 4) (step S12 in FIG. 9, t6 in FIG. 10).

When a recording request is received and "Drv" designates the flash memory 4, the file manager FM requests the file system MSFS (see FIGS. 3 and 4) to record data. In this case, the data supplied to the FPGA 6 is recorded in the flash memory 4 by the processing of the file system MSFS, the main storage manager MSM, and the main storage controller MS.

On the other hand, when "Drv" designates the optical disc drive 5, the file manager FM requests the file system PDFS (see FIGS. 3 and 4) to record data. In this case, the data supplied to the FPGA 6 is recorded in the optical disc drive 5 by the processing of the file system PDFS and the program PDDIF.

When recording into the flash memory 4 or the optical disc drive 5 is completed, the file manager FM notifies the bank memory manager BMM of the recorded number of bytes as a response to the recording request (t7 in FIG. 10).

On receiving such notification from the file manager FM (step S13 in FIG. 9), the bank memory manager BMM notifies the clip manager CM of the number of bytes indicated by the file manager FM as a response to the recording request (step S14 in FIG. 9, t8 in FIG. 10).

On receiving such notification that the recording of the data that had accumulated in the bank 2a in the flash memory 4 or the optical disc drive 5 has been completed, the clip manager CM sends a freeing request for such bank 2a together with the address x of the bank 2a and "Box", "Drv, "ClipID", "Essence", "Offset", and "Size" information (see FIG. 7) of such bank 2a to the bank memory manager BMM (t9 in FIG. 10).

On receiving the freeing request (step S15 in FIG. 9), the bank memory manager BMM decrements the value of "Count" in the bitmap for the bank 2a indicated by the address x by one while leaving the information from "Box" to "Size" in such bitmap (step S16 in FIG. 9). After this, the bank memory manager BMM notifies the clip manager CM that the freeing has been completed (step S17 in FIG. 9, t10 in FIG. 10).

Note that since there are cases where the clip manager CM will request a retrying of recording when recording in the flash memory 4 or the optical disc drive 5 has failed, the bank memory manager BMM does not free the bank 2a until a freeing request has been received from the clip manager CM.

When the processing in steps S7 to S17 in FIG. 9 has been completed for every reserved bank 2a (step S18 in FIG. 9), the processing in FIG. 9 is completed.

Next, the processing of the bank memory manager BMM during playback of AV data will be described. When a playback command that designates one of the SDI input/output ports 1 and a playback source (the flash memory 4 or the optical disc drive 5) for AV data is received by the FPGA 9, the command is interpreted by the processing of the program CMD (see FIG. 3) and a command is sent to the port manager PM (see FIG. 3) of the designated SDI input/output port 1.

Figure 11:
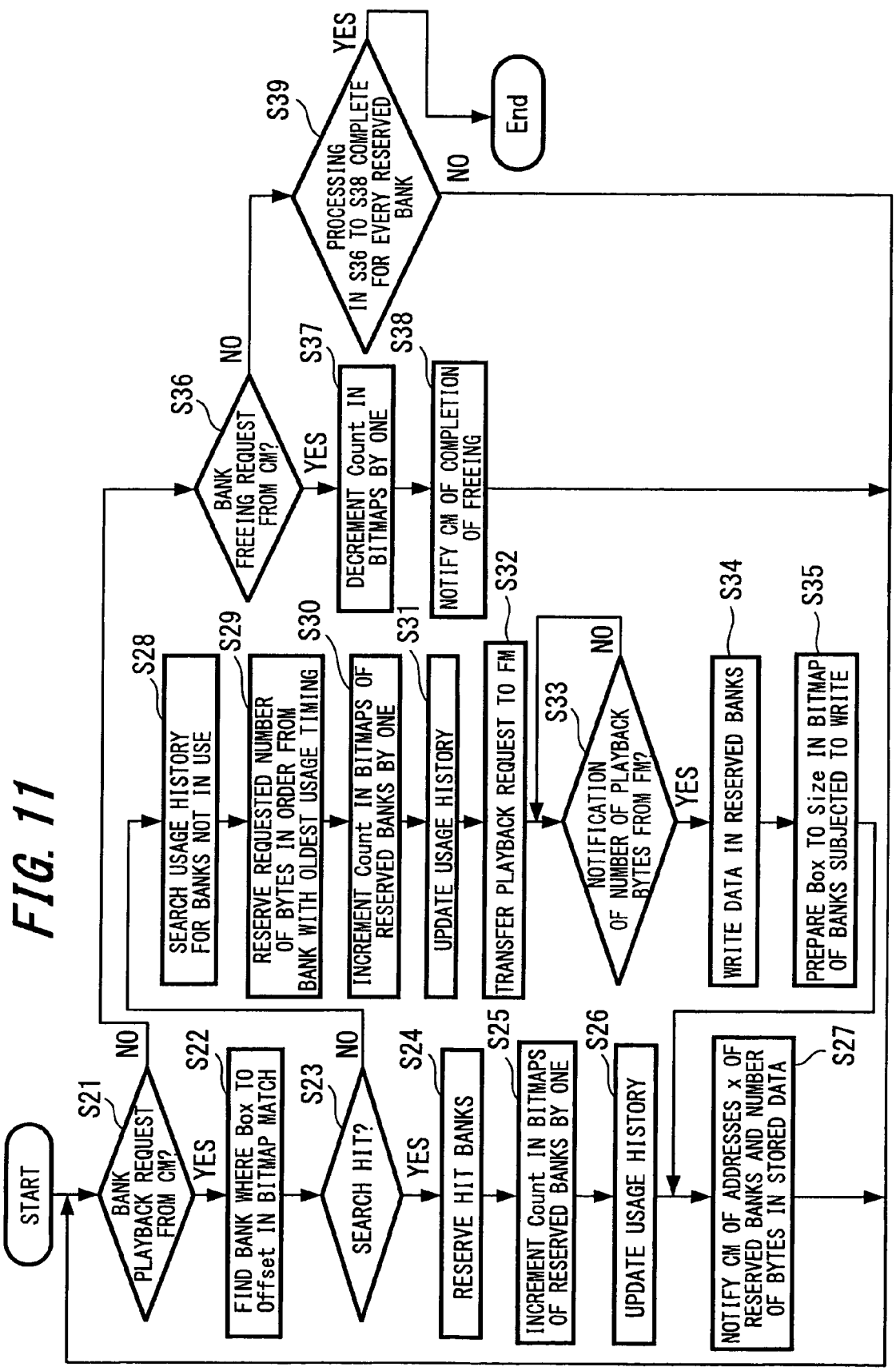
FIG. 11 is a flowchart showing the processing of the bank memory manager during playback.
Figure 12:
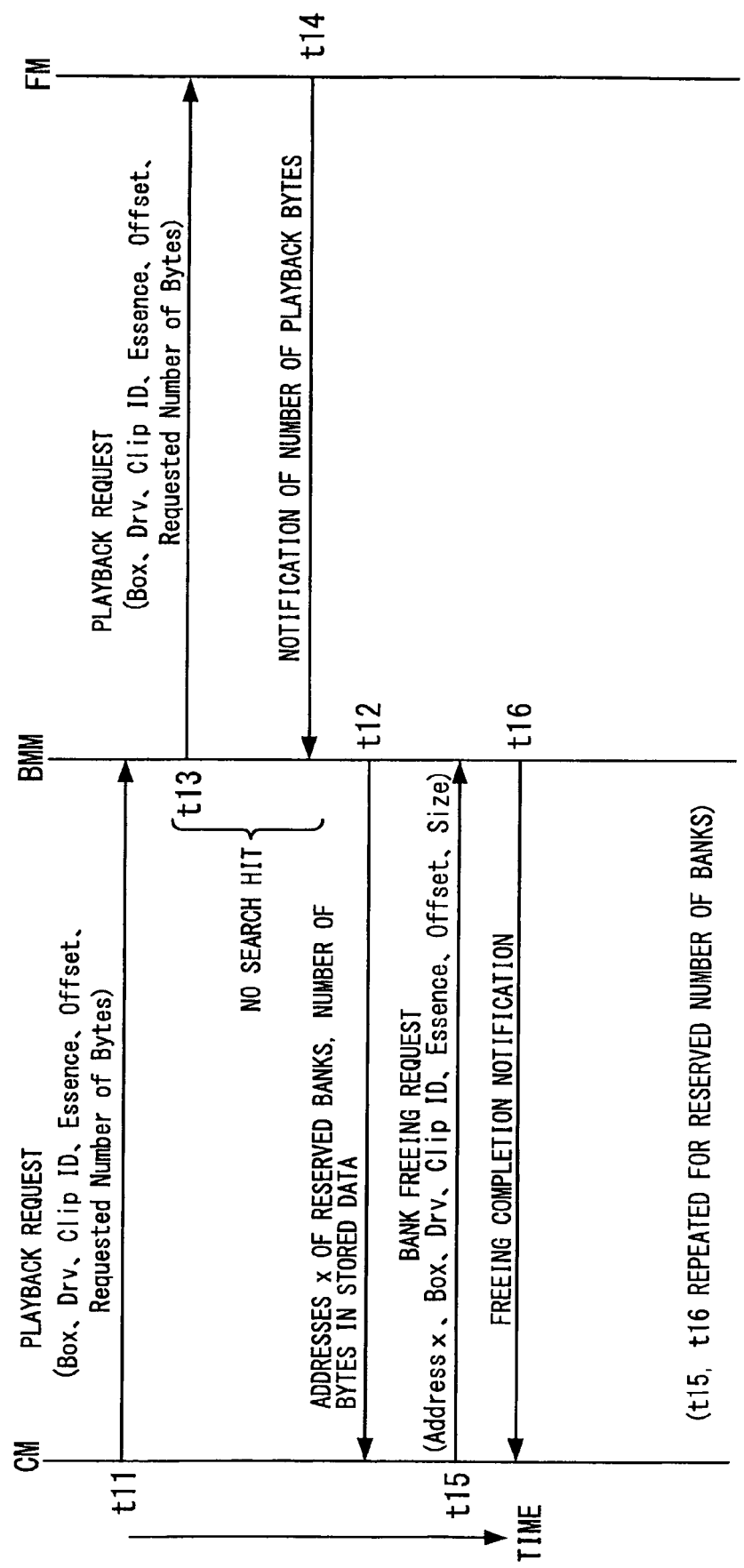
FIG. 12 is a diagram showing the communication between the clip manager, the bank memory manager, and the file manager during playback.

The port manager PM transfers this command to the clip manager CM (see FIGS. 3 and 4). Based on this command, the clip manager CM sends a playback request for AV data to the bank memory manager BMM. FIG. 11 is a flowchart showing the processing of the bank memory manager BMM based on this playback command. FIG. 12 shows the communication between the clip manager CM, the bank memory manager BMM, and the file manager FM on a time axis during playback.

The clip manager CM sends a playback request for AV data together with "Box", "Drv", "ClipID", "Essence", "Offset" shown in FIG. 7 and information on the number of bytes of data to be played back to the bank memory manager BMM (t11 in FIG. 12).

On receiving the playback request (step S21 in FIG. 11), the bank memory manager BMM compares the "Box", "Drv, "ClipID", "Essence", and "Offset" information received together with the playback request with the "Box", "Drv, "ClipID", "Essence", and "Offset" information in the bitmaps (see FIG. 7) prepared for the respective banks 2a of the bank memory 2 to search for the bank 2a whose "Box", "Drv", "ClipID", "Essence", and "Offset" information in the bitmap match the playback request (step S22 in FIG. 11).

Note that in step S22, when a matching bank 2a is found but the value of "Size" (here, "M") in the bitmap of such bank 2a is below the number of bytes (here, "N") requested for playback, a search is conducted for a second bank 2a by changing the value of "Offset" (here, "A") and the number of bytes requested for playback to "A+M+1" and "N−M", respectively.

As shown in FIG. 11, after step S22, it is determined whether there is a search hit (i.e., whether a matching bank 2a has been found) (step S23 in FIG. 11). If the result is "YES", the banks 2a found as the hit are reserved (step S24 in FIG. 11). After this, the value of "Count" in the bitmaps for the reserved banks 2a is incremented by one (step S25 in FIG. 11) and the usage history information is updated to register the reserved banks 2a as the banks with the most recent usage timing (step S26 in FIG. 11).

Subsequently, as a response to the playback request, the addresses x of the reserved banks 2a and the number of bytes of data stored in the banks 2a are notified to the clip manager CM (step S27 in FIG. 11, t12 in FIG. 12). Here, the clip manager CM is notified of the stored data size in byte units so that chasing playback can be carried out at maximum speed during playback at a low bitrate or variable bitrate.

If the determination result is "NO" in step S23, the usage history information is referred to (see FIG. 8) and out of the banks 2a of the bank memory 2, a search is conducted for banks 2a that are presently not being used (step S28 in FIG. 11). Next, out of the banks that have been found, a number of banks 2a with the number of bytes for which playback has been requested are reserved in order starting from the oldest usage timing (step S29 in FIG. 11).

After this, the value of "Count" in the bitmaps for the reserved banks 2a are incremented by one (step S30 in FIG. 11) and the usage history information is updated so as to register the reserved banks 2a as banks 2a with the most recent usage timing (step S31 in FIG. 11).

Next, a playback request from the clip manager CM is transferred to the file manager FM (see FIGS. 3 and 4) (step S32 in FIG. 11, t13 in FIG. 12).

When a playback request has been transferred and "Drv" designates the flash memory 4, the file manager FM requests the file system MSFS (see FIGS. 3 and 4) to play back data. In this case, data is played back from the flash memory 4 and supplied to the bank memory controller 3 by the processing of the file system MSFS, the main storage manager MSM, and the main storage controller MS.

On the other hand, when "Drv" designates the optical disc drive 5, the file manager FM requests the file system PDFS (see FIGS. 3 and 4) to play back data. In this case, data is played back from the optical disc drive 5 and supplied to the bank memory controller 3 by the processing of the file system PDFS and the program PDDIF.

When playback from the flash memory 4 or the optical disc drive 5 is completed, the file manager FM notifies the bank memory manager BMM of the played back number of bytes as a response to the playback request (t14 in FIG. 12).

On receiving such notification from the file manager FM (step S33 in FIG. 11), the bank memory manager BMM controls the bank memory controller 3 to have data written into the reserved banks 2a (step S34 in FIG. 11). Next, the information from "Box" to "Size" (see FIG. 7) is prepared in the bitmaps for the banks 2a for which a write has been carried out (step S35 in FIG. 11) and the processing then proceeds to step S27 in FIG. 11, t12 in FIG. 12.

On receiving the notification in step S27 in FIG. 11 and t12 of FIG. 12, the clip manager CM controls the bank memory controller 3 to have data with the number of bytes requested for playback read from the reserved banks 2a and supplied to the SDI input/output port 1.

Next, when data with the number of bytes requested for playback has been read, the clip manager CM sends a freeing request for the bank(s) 2a together with the address of the bank(s) 2a and "Box", "Drv", "ClipID", "Essence", "Offset", and "Size" information (see FIG. 7) for the bank(s) 2a to the bank memory manager BMM (t15 in FIG. 12).

On receiving the freeing request (step S36 in FIG. 11), the bank memory manager BMM carries out the same processing as in steps S16 and S17 during recording that was shown in FIG. 9 (S37 and S38 in FIG. 11, t16 in FIG. 12).

When the processing in steps S36 to S38 in FIG. 11 has been completed for every reserved bank 2a (step S39 in FIG. 11), the processing shown in FIG. 11 is completed.

FIG. 13 shows a representation of the bitmaps for the banks 2a of the bank memory 2 during the processing shown in FIGS. 9 and 11 and a representation of the linking of banks 2a for the three ports (indicated as Ports #1 to #3) out of all of the SDI input/output ports 1 by the clip manager CM.

In FIG. 13, an example is shown where data A is recorded by Port#1, other data C is subjected to forward playback using the banks 2a with the addresses x=0 to 2 before chasing playback starts for data A by Port#2, and other data B is recorded by Port#3.

Each clip manager CM manages a plurality of banks 2a being used by the corresponding SDI input/output port 1 by linking the banks 2a for a predetermined number of bytes centered on the position of the bank 2a for which a read or write is presently being carried out.

Here, the clip manager CM for Port#1 links a bank 2a with the address x=6 and a bank 2a with the address x=7 as the banks 2a being used by Port#1.

When chasing playback of the data A starts, the clip manager CM for Port#2 links the bank 2*a* with the address x=1, the bank 2*a* with the address x=2, and the bank 2*a* with the address x=6 as the banks 2*a* being used by Port#2 (although not shown in the drawings, the banks 2*a* with the address x=0 to 2 are linked during forward playback of data C, and when chasing playback of the data A starts, the bank 2*a* with the address x=0 is unlinked and the bank 2*a* with the address x=6 is newly linked).

The clip manager CM for Port#3 links the bank 2*a* with the address x=8 and the bank 2*a* with the address x=9 as the banks 2*a* being used by Port#3.

The "Count" value in the bitmaps for the bank 2*a* with the address x=7 used by only Port#1, the banks 2*a* with the addresses x=1, 2 used by only Port#2, and the banks 2*a* with the addresses x=8, 9 used by only Port#3 is set at "1".

The "Count" value in the bitmap for bank 2*a* with the address x=6 used by both Port#1 and Port#2 is set at "2". Here, even if recording of the data that has accumulated in the bank 2*a* with the address x=6 in the flash memory 4 or the optical disc drive 5 is completed and the bank 2*a* with the address x=6 is freed by a freeing request by the clip manager CM for Port#1, the "Count" value in the bitmap will still only become "1", so that the bank 2*a* with the address x=6 is not placed in the unused state (i.e., such bank 2*a* is still being used by Port#2).

Since the remaining banks 2*a* are not used by any of the SDI input/output ports 1, the "Count" value in the bitmap is zero.

Since data that was stored during use remains in the banks 2*a* that are no longer used, such data can be used for playback. For example, for Port#2, if the data C is subjected to reverse playback after chasing playback of the data A, data will remain in the bank 2*a* with the address x=0 that has been unlinked, and therefore it will be possible to carry out reverse playback using the banks 2*a* with the addresses x=2, 1, 0 in that order immediately without accessing the flash memory 4 or the optical disc drive 5 (i.e., the clip manager CM for Port#2 unlinks the bank 2*a* with the address x=6 and newly links the bank 2*a* with the address x=0).

FIGS. 14A and 14B are diagrams showing an example of how chasing playback is carried out by the processing in FIGS. 9 and 11 using the bank memory 2. Note that in FIGS. 14A and 14B, the size of each bank 2*a* is set at 60 pages (where one page is the number of bytes that is a unit for recording and playback for the flash memory 4 (see FIG. 2)).

In FIG. 14A, recording by the processing described in FIG. 9 is shown divided into four stages on the time axis. The first stage in FIG. 14A shows a state where the banks 2*a* are yet to be reserved.

The second stage in FIG. 14A shows a state immediately after two banks 2*a* with a "Count" value zero (i.e., banks not being used) have been reserved, where the writing of data from the first frame (i.e., the first page) into the first reserved bank 2*a* (the bank 2*a* on the left in the drawing out of the two reserved banks 2*a*) has started.

The third stage in FIG. 14A shows a state immediately after the recording of around 30 frames (i.e., fifty pages) of data that have accumulated in the first bank 2*a* in the flash memory 4 has been completed and such bank 2*a* has been freed, where the writing of data from around the thirty-first frame (i.e., the fifty-first page) into the second reserved bank 2*a* has started.

The fourth stage in FIG. 14A shows a state after the time equivalent to around fifteen frames has passed following the third stage, where data of around fifteen frames (thirty pages) has been written in the reserved second bank 2*a* but such data has not yet been recorded in the flash memory 4.

FIG. 14B shows a state where chasing playback of data from around the twenty-fifth frame (the fortieth page) to the fortieth frame (the sixty-fifth page) is carried out by the processing in FIG. 11 at the same timing as the fourth stage in FIG. 14A.

The first bank 2*a* that was used for recording is reserved again, and out of the approximately thirty frames (fifty pages) of data remaining in such bank 2*a*, the data from approximately the twenty-fifth frame (fortieth page) to the thirtieth frame (fiftieth page) is read out.

The second bank 2*a* that is presently being used for recording is also reserved, and out of the approximately fifteen frames (thirty pages) of data stored in the bank 2*a* (i.e. data yet to be recorded in the flash memory 4), approximately ten frames (fifteen pages) of data from the start, that is, data from the equivalent of the thirty-first frame (fifty-first page) to the fortieth frame (sixty-fifth page) is read out from the first bank 2*a*.

As shown in FIGS. 14A and 14B, in this AV server, there are many cases where the bank memory 2 is used as a cache memory so that chasing playback can be carried out at high speed without the flash memory 4 or the optical disc drive 5 being accessed (that is, without being affected by an access wait time for the flash memory 4 due to time slot management or a seek time when data is played back from the optical disc drive 5). By doing so, it is possible to improve the responsiveness of chasing playback.

Chasing playback is also carried out by this AV server during the inputting and recording of AV data from any of the SDI input/output ports 1 to allow the user to decide cut edit points on the editing operation panel 10 while viewing proxy data included in such AV data that is immediately outputted from another SDI input/output port 1 and displayed on a monitor or the like (when an operation that decides the cut edit points is carried out, the AV data recorded in the flash memory 4 and the optical disc drive 5 is subjected to a cut edit by the processing of the program EFM or the like shown in FIG. 3). Accordingly, in this AV server, it is possible to improve the responsiveness when chasing playback is carried out for editing purposes.

Also, as described for Port#2 in FIG. 13, since there is a high probability of data remaining in banks 2*a* that have been unlinked when reverse playback is carried out after forward playback, reverse playback can be carried out at high speed using the bank memory 2 as a cache memory without accessing the flash memory 4 or the optical disc drive 5. As a result, it is possible to improve the responsiveness during repeated forward/reverse playback.

By using the bank memory 2 as a cache memory as described above, it is possible to reduce the number of accesses to the flash memory 4, resulting in an increase in the number of free time slots managed by the main storage manager MSM (see FIGS. 3 and 4). This leads to improved responsiveness during recording and normal playback that access the flash memory 4.

The functions of the bank memory manager BMM are not limited to chasing playback and forward/reverse playback during normal operation and can also be used when debugging is carried out using the bank memory 2 during diagnostics on the AV server. Although an existing AV server is provided with a dedicated program for such debugging in the bank memory, according to an embodiment of the present invention it may not be necessary to provide such dedicated program.

Note that although the present invention is applied to an AV server with a flash memory as main storage and an editing function in the example described above, the present invention can also be applied to an AV server that uses main storage that is not flash memory (for example, a hard disk drive), an AV server that does not have an editing function, and a non-linear editor for TV broadcasts. In addition, the present invention is not limited to an AV server or a non-linear editor for TV broadcasts and can also be applied to all kinds of data processing apparatuses that access a non-linear recording medium from two or more input/output ports to record and play back video data.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus comprising:
a plurality of ports for inputting and outputting audio/video data having a plurality of data types;
a memory for storing the audio/video data (a) prior to the audio/video data being recorded onto a recording medium and (b) when the audio/video data is played back from the recording medium, the memory partitioned into regions of at least 8 MB, each region stores only one type of audio/video data of the plurality of data types;
determining means for determining whether audio/video data, for which a video data playback request designating one of the plurality of ports has been issued, is currently stored in the memory one of (a) prior to being overwritten after being recorded on the recording medium and (b) before being recorded onto the recording medium, using (1) data identification information for identifying the type of audio/video data of the plurality of data types stored in each region in the memory and (2) usage management information showing whether each region in the memory is currently being used by two or more of the ports; and
processing means operable to have the audio/video data currently stored in the memory outputted from the designated port without accessing the recording medium for the video data for the playback request, when the determining means determines that the audio/video data is currently stored in the memory one of (a) prior to being overwritten after being recorded on the recording medium and (b) before being recorded onto the recording medium.

2. A data processing apparatus according to claim 1, wherein the data identification information that was prepared when video data was stored in a memory region is kept even when the memory region is no longer being used by any of the ports, and the determining means determines whether the video data is stored by also using the data identification information for the memory regions that are no longer being used by any of the ports.

3. A data processing apparatus according to claim 2, wherein the processing means is operable to refer to a usage history of each region in the memory up to the present to use regions out of the regions that are not presently in use in order starting with a region that has not been used for the longest time, when there has been a recording request for video data that designates one of the ports, or when there is the playback request and the determining means has determined that the video data is not stored in the memory.

4. A data processing apparatus according to claim 1,
wherein the video data is recorded in the recording medium every time a predetermined amount of the video data has accumulated in the memory, and
the data processing apparatus further includes preparing means for preparing the data identification information every time a smaller amount of video data than the predetermined amount has been written in the memory.

5. A data processing apparatus according to claim 1,
wherein the data identification information includes an ID for identifying one piece of video data, offset information showing a number of bytes between the start of the piece of video data and a storage position, and size information for the stored video data, and
the playback request is carried out using the ID, the offset information showing the number of bytes between the start of one piece of video data and a playback start position, and the size information of the video data to be played back.

6. A data processing apparatus according to claim 5,
wherein the determining means compares the ID, the offset information, and the size information in the data identification information with the ID, the offset information, and the size information used in the playback request to determine whether the video data of the playback request is stored in the memory.

7. A data processing method comprising the steps of:
storing audio/video data having a plurality of data types into a memory (a) before the audio/video data is recorded onto a recording medium and (b) when the audio/video data is played back from the recording medium, the memory partitioned into regions of at least 8 MB, each region stores only one type of audio/video data of the plurality of data types;
determining, whether audio/video data, for which a video data playback request designating a port has been issued, is currently stored in the memory one of (a) prior to being overwritten after being recorded on a recording medium and (b) before being recorded onto the recording medium, using (1) data identification information, which identifies the type of audio/video data of the plurality of data types stored in each region in the memory that stores the audio/video data when the audio/video data is recorded onto the recording medium and when the audio/video data is played back from the recording medium, and (2) usage management information showing whether each region in the memory is currently being used by two or more of the ports that inputs or outputs the audio/video data; and
outputting the audio/video data currently stored in the memory from the designated port without accessing the recording medium for the audio/video data for the playback request, when it is determined in the determining step that the audio/video data is currently stored in the memory one of (a) prior to being overwritten after being recorded on the recording medium and (b) before being recorded onto the recording medium.

8. A data processing apparatus comprising:
a plurality of ports configured to input and output audio/video data having a plurality of data types;
a memory configured to store the audio/video data (a) prior to the video audio/video data being recorded onto a recording medium and (b) when the audio/video data is played back from the recording medium, the memory partitioned into regions of at least 8 MB, each region only stores one type of audio/video data of the plurality of data types;

a determining unit configured to determine whether audio/video data, for which a video data playback request designating one of the plurality of ports has been issued, is currently stored in the memory one of (a) prior to being overwritten after being recorded on the recording medium and (b) before being recorded onto the recording medium, using (1) data identification information for identifying the type of audio/video data of the plurality of data types stored in each region in the memory and (2) usage management information showing whether each region in the memory is currently being used by two or more of the ports; and a processing unit operable to have the audio/video data currently stored in the memory outputted from the designated port without accessing the recording medium for the audio/video data for the playback request, when the determining unit determines that the audio/video data is currently stored in the memory one of (a) prior to being overwritten after being recorded on the recording medium and (b) before being recorded onto the recording medium.

* * * * *